(12) United States Patent
Chiu

(10) Patent No.: US 6,260,983 B1
(45) Date of Patent: Jul. 17, 2001

(54) MULTIFUNCTIONAL DECORATING LIGHT

(76) Inventor: Hua Jung Chiu, No. 10, Wu Chuan Road, Wu Ku Hsiang, Taipei Hsien (TW)

( * ) Notice: Subject to any disclaimer, the term of this patent is extended or adjusted under 35 U.S.C. 154(b) by 0 days.

(21) Appl. No.: 09/497,660

(22) Filed: Feb. 4, 2000

(51) Int. Cl.[7] .......................... F21V 21/30; F21W 131/30
(52) U.S. Cl. .......................... 362/154; 362/253; 362/287; 362/427
(58) Field of Search .......................... 362/127, 132–134, 362/154–156, 197–199, 86, 253, 287, 422, 427

(56) References Cited

U.S. PATENT DOCUMENTS

| | | | | |
|---|---|---|---|---|
| 4,652,068 | * | 3/1987 | Boekholt | 362/427 |
| 4,914,545 | * | 4/1990 | Price | 362/155 |
| 5,154,291 | * | 10/1992 | Sur | 362/154 |
| 5,169,226 | * | 12/1992 | Friedman | 362/199 |
| 5,412,887 | * | 5/1995 | Layne | 40/152.2 |
| 5,521,802 | * | 5/1996 | Edington | 362/155 |
| 5,584,398 | * | 12/1996 | Lin | 362/253 |
| 5,685,421 | * | 11/1997 | Gilmore | 362/156 |
| 5,961,200 | * | 10/1999 | Friis | 362/132 |

* cited by examiner

*Primary Examiner*—Alan Cariaso
(74) *Attorney, Agent, or Firm*—Rosenberg, Klein & Lee

(57) ABSTRACT

The present invention proposes a multifunctional decorating light, which comprises a CD case, a light stand, and an illuminating lamp. The foldable CD case is formed with two case shells pivotally joined along one side thereof. An accommodating channel is installed on the CD case. A foldable light stand is pivotally installed in the accommodating channel. A sideward retractable frame is installed on the light stand to be pivotally connected to an illuminating lamp. Thereby the assembled light with the unfolded light stand can be levelly placed on a desk to be used as a desk light. It can also be inserted in the top slot of a CD box to be used as a CD box light when the light stand is folded in the accommodating channel. It can be used as a wall light if the CD case is erectly hung on a wall. Moreover, it can be used as a photograph frame light when the two case shells are opened with insertion of a photograph in one of them. In other words, the present invention can be used in various situations through simple operation.

10 Claims, 7 Drawing Sheets

MULTIFUNCTIONAL DECORATING LIGHT

FIELD OF THE INVENTION

The present invention relates to a decorating light and, more particularly, to a multifunctional decorating light with an illuminating lamp and a CD case delicately assembled such that it can be used as a desk light, a CD box light, a photograph frame light, or a wall light according to necessity.

BACKGROUND OF THE INVENTION

To meet various requirements in different environments, various lights, such as desk lights for reading and writing, wall lights for illuminating the wall or artifacts, streetlights for night illumination, emergency lights installed at important evacuating passages or locations, or even car lights, have been developed. Due to different uses, their structures and configurations differ greatly such that they can not be substituted for each other. Each light thus has only a limited degree of usage.

More importantly, some situations in which illumination is needed to exhibit their features do not have specific illuminating lamps. As a result, other lights are borrowed informally for their illumination. For instance, a compact disk (CD) box for accommodating CDs, video CDs (VCDs), digital versatile disks (DVDs) has no specific illuminating lamps, external light is used for illumination instead. A photograph frame is another example having no specific illuminating lamp to exhibit figures in the photograph.

SUMMARY AND OBJECTS OF THE PRESENT INVENTION

Accordingly, one object of the present invention is to provide a multifunctional decorating light with an illuminating lamp and a CD case delicately assembled such that it can be used as a desk light, a CD box light, a photograph frame light, or a wall light through simple operation.

According to the present invention, an accommodating channel is installed on a CD case. A foldable light stand is pivotally installed in the accommodating channel. A retractable frame is installed on the light stand to be pivotally connected to an illuminating lamp. The light stand can be unfolded or folded with respect to the CD case according to different uses. The CD case can also be levelly or erectly placed. Moreover, the two case shells of the CD case can be opened. Thereby the light of the present invention can be transformed to a different light mentioned above.

The various objects and advantages of the present invention will be more readily understood from the following detailed description when read in conjunction with the appended drawings, in which:

DETAILED DESCRIPTION OF PREFERRED EMBODIMENT

Figure 1:
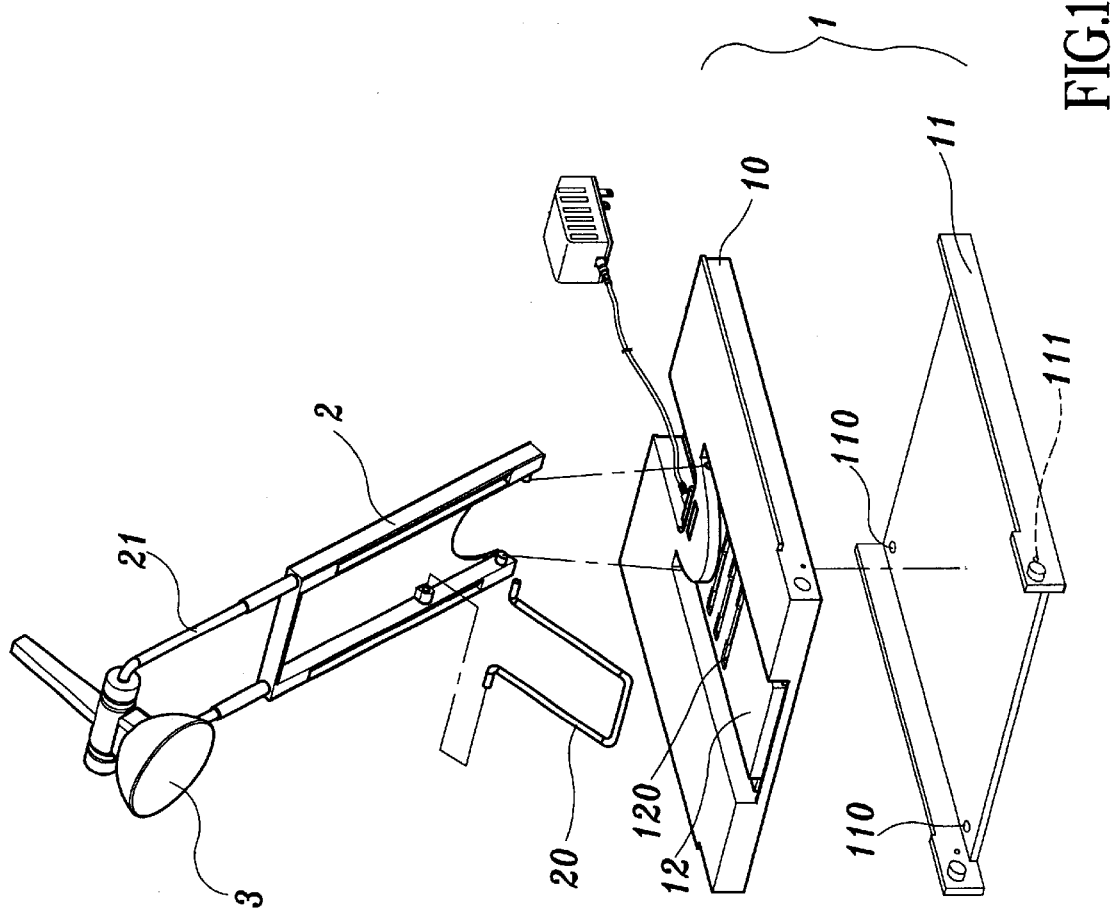
FIG. 1 is an exploded perspective view of a multifunctional light of the present invention.

As shown in FIG. 1, a multifunctional decorating light of the present invention comprises primarily a CD case 1, a light stand 2, and an illuminating lamp 3.

Figure 2:
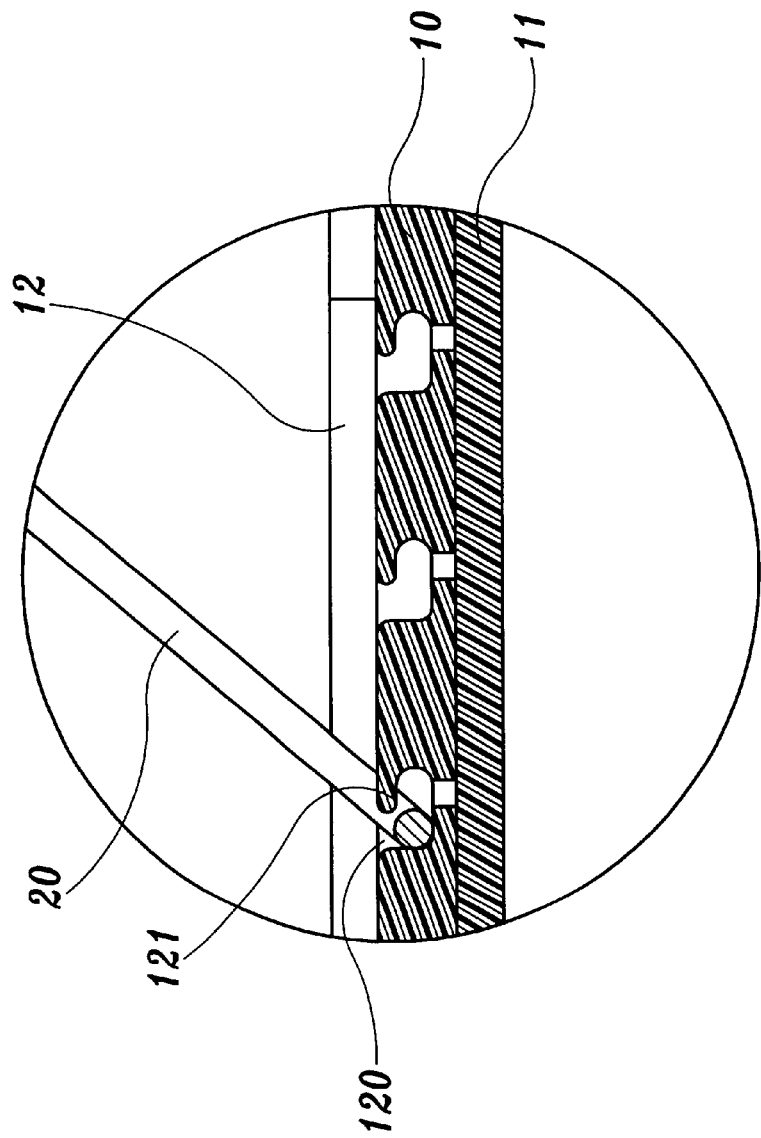
FIG. 2 a locally enlarged cross-sectional side view showing how a supporting frame sticks in a positioning groove of the CD case of the present invention.

Two opposite CD shells (a first case shell 10 and a second case shell 11) are pivotally joined along one side thereof to form the foldable CD case 1. The configuration and size of the CD case 1 are the same as those of general CD cases, VCD cases, or DVD cases. An accommodating channel 12 can be disposed on the first case shell 10 and extends from one side to the opposite side thereof. A plurality of spaced positioning grooves 120 are cisposed on the bottom of the accommodating channel 12. As shown in FIG. 2, a locking plate 121 is installed inward at one side of the opening of each positioning groove 120.

The light stand 2 is a plate commensurate in size with the accommodating channel 12. One side of the light stand 2 can be pivotally installed in the inner side of the accommodating channel 12 such that the light stand 2 can be unfolded with respective to the CD case 1 or folded to be hidd☐☐en in the accommodating channel 12. A U-shaped supporting frame 20 is pivotally installed on the bottom of the light stand 2 such that the U-shaped supporting frame 20 can be fixedly embedded in a proper positioning groove 120 to achieve supporting function when the light stand 2 is A pair of sideward retractable frames 21 can be installed in the light stand 2.

Figure 3:
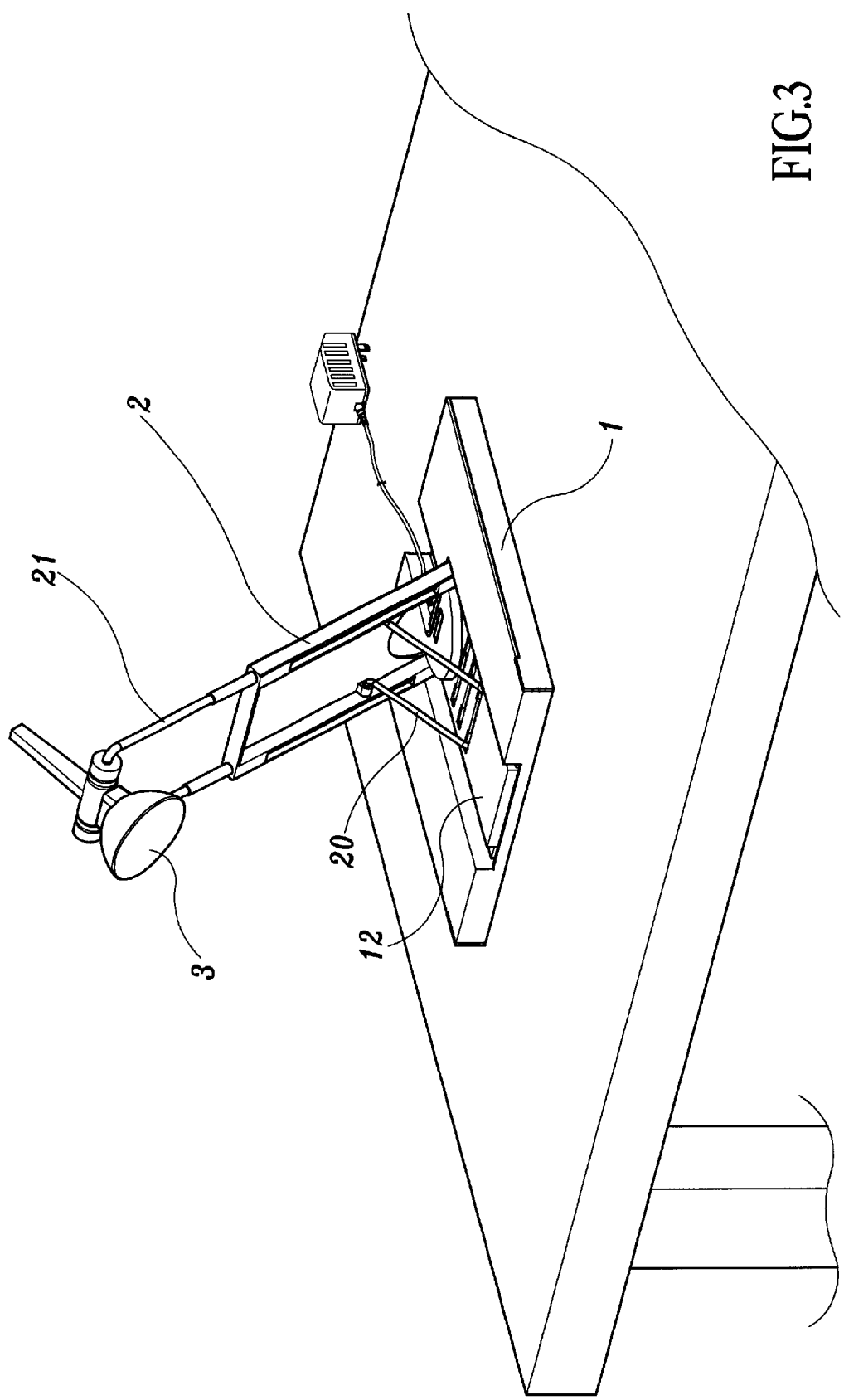
FIG. 3 is a perspective view showing how the present invention is used as a desk light.
Figure 4:
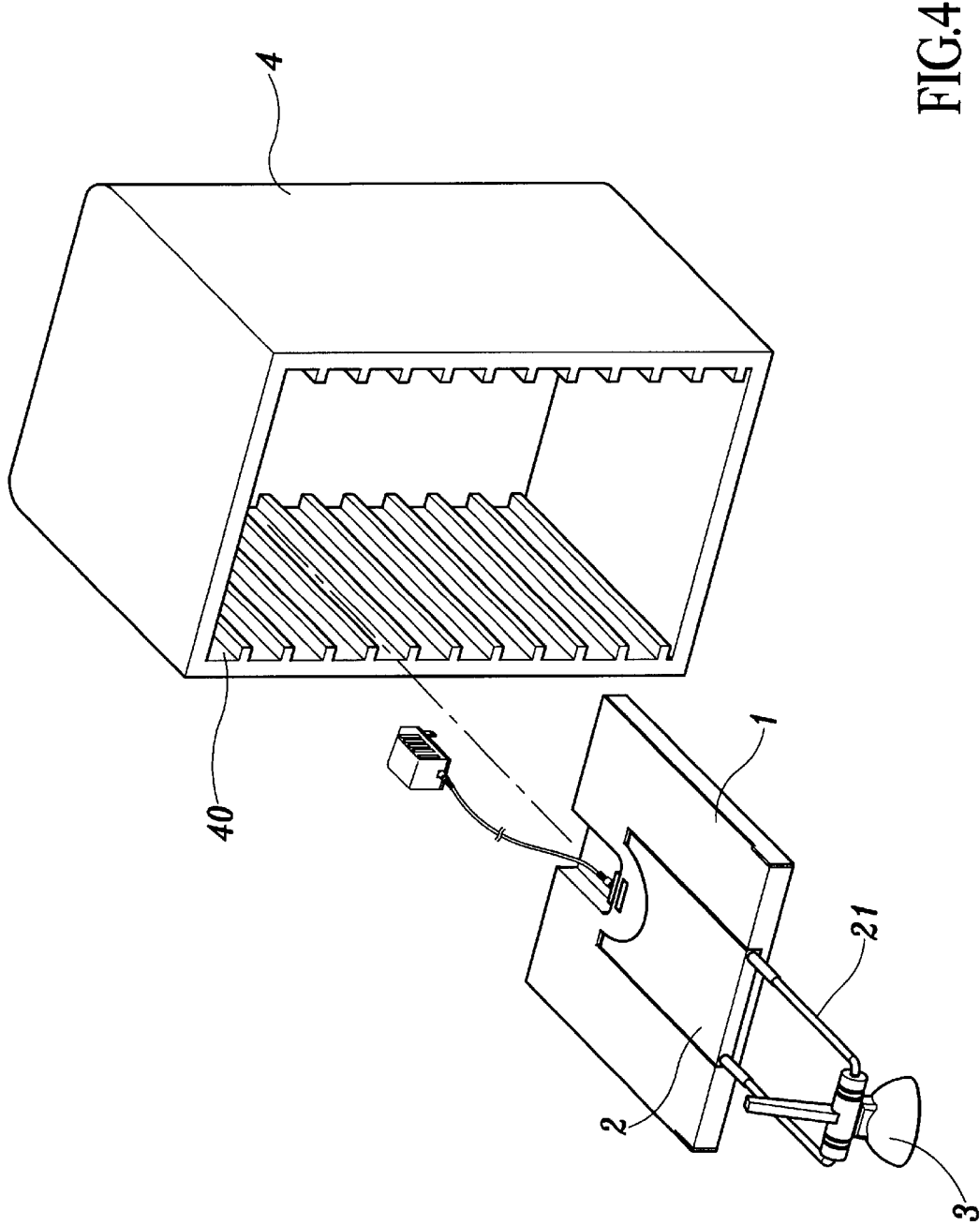
FIG. 4 is an exploded perspective view showing how the present invention is used as a CD box light.
Figure 5:
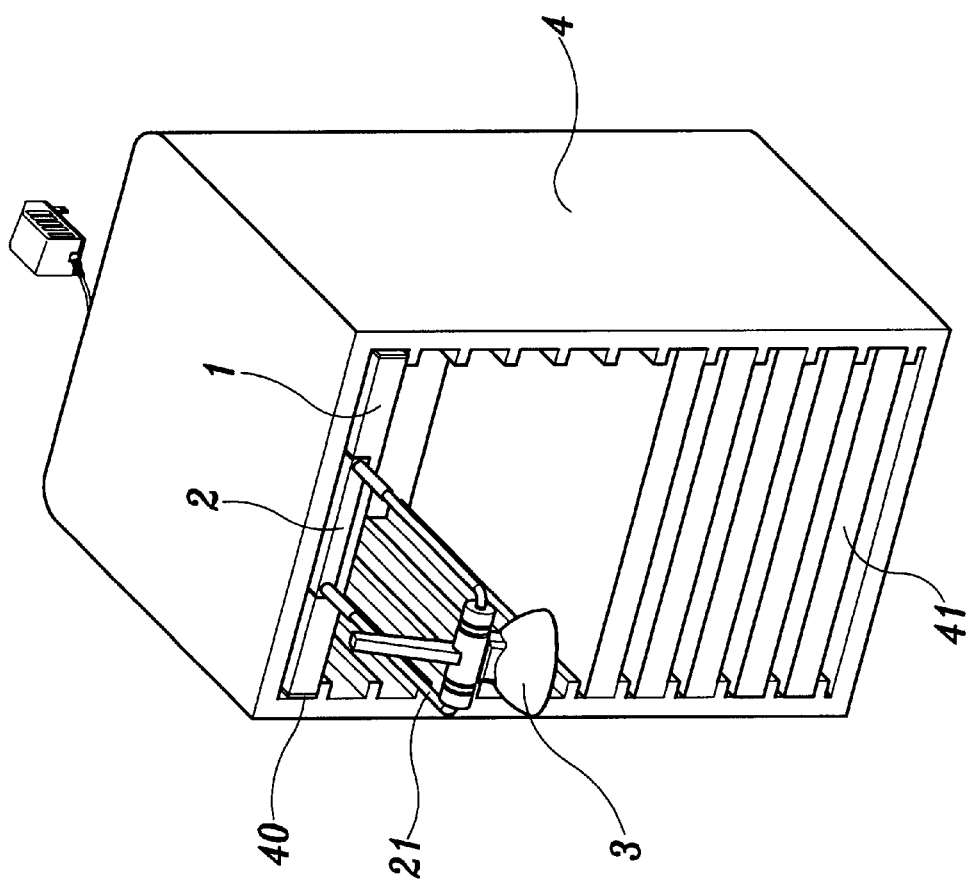
FIG. 5 is another perspective view showing how the present invention is used as a CD box light.
Figure 6:
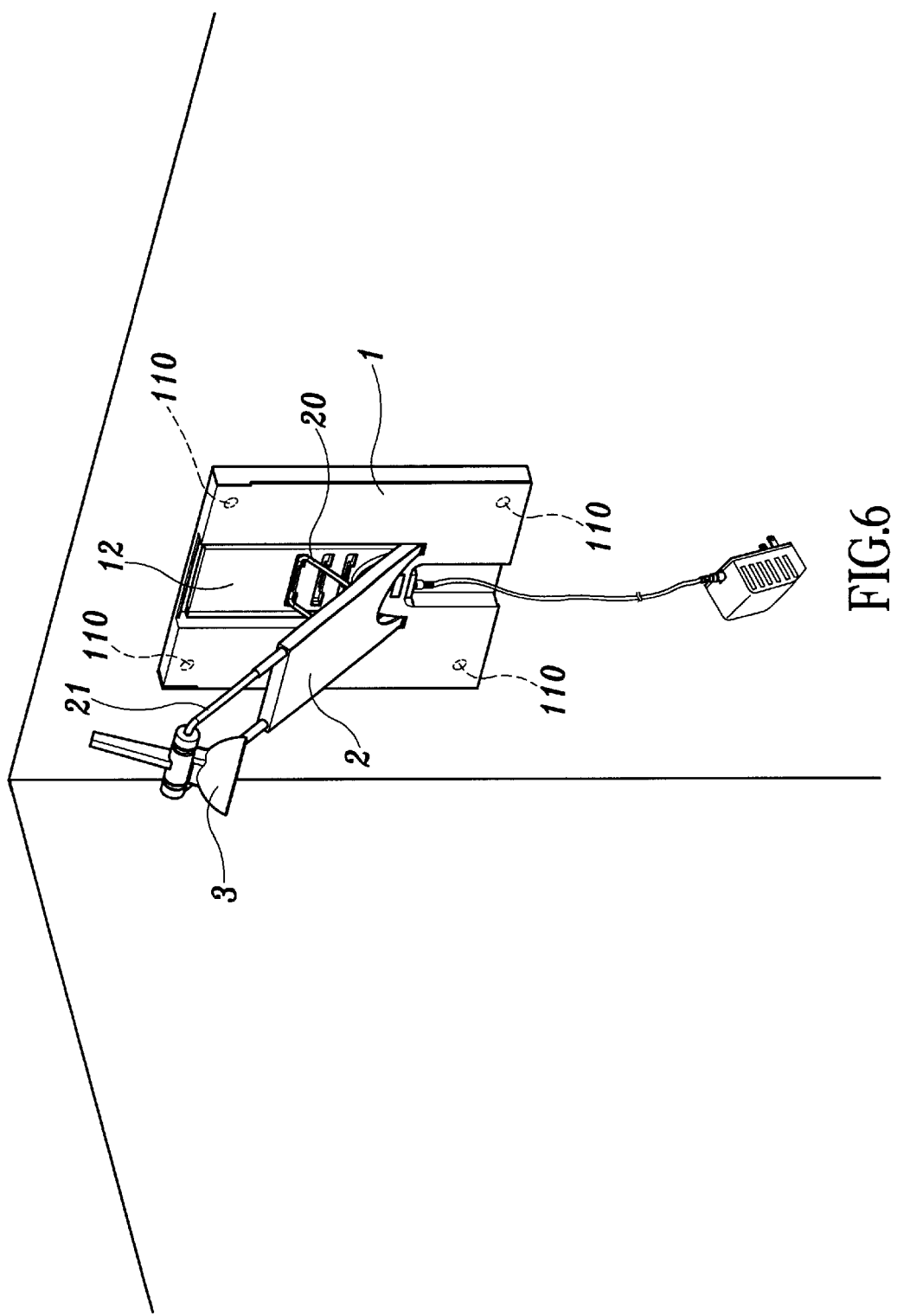
FIG. 6 is a perspective view showing how the present invention is used as a wall light.

The illuminating lamp 3 is pivotally installed at the free end of the retractable frame 21. The retractable frame 21 can be itself a conductor to provide electricity for the illuminating lamp As shown in FIG. 3, the CD case 1 can be levelly placed on a desk with the unfolding of the light stand 2 and sideward support of the supporting frame 20 to form a desk light for reading and As shown in FIGS. 4 and 5, the light stand 2 folded in the accommodating channel 12 and the CD case 1 can be assembled to form the same configuration as those of general CD cases, VCD cases, or DVD cases. The CD case 1 can be inserted in the top slot of a CD box 4 having a plurality of slots 40. When the illuminating lamp 3 is turned downwards, it can be used to illuminate the CD box As shown in FIG. 6, a plurality of hanging holes 110 can be disposed on the second se shell 11 such that the whole CD case 1 can be erectly hung on the wall. When the angle of the illuminating lamp 3 is adjusted, it can be used to illuminate the wall or artifacts near the wall.

Figure 7:
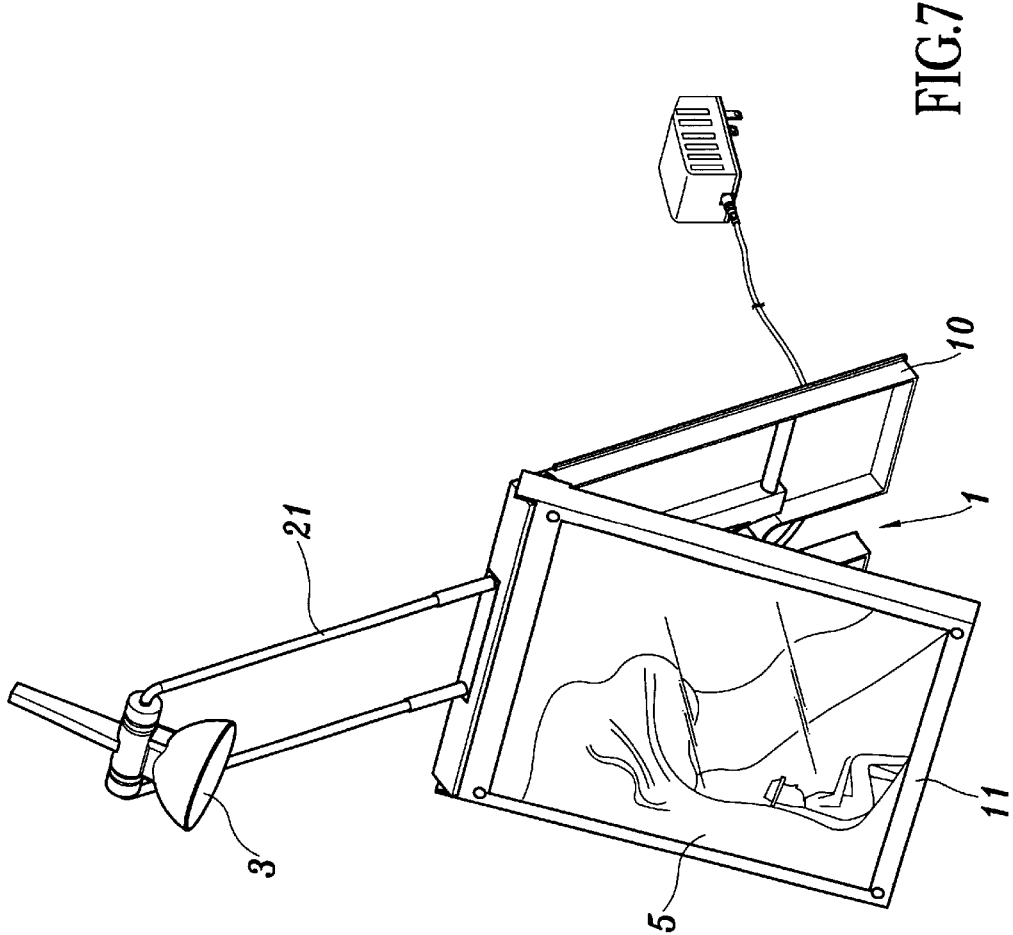
FIG. 7 is a perspective view showing how the present invention is used as a photograph frame light.

As shown in FIG. 7, the first case shell 10 and the second case shell 11 can be opened with the opening facing downwards such that the CD case 1 can be supported on a plane. A projecting bump 111 and at least a corresponding concavity 110 (shown in FIG. 1) can be installed at the positions where the two case shells pivotally joined such that the two case shells can be positioned when opened to a predetermined angle. The illuminating lamp 3 can be adjusted to point to the second case shell 11. A photograph frame light is thus formed. A photograph 5 can be placed in the second case shell 11 to be illuminated.

To sum up, the present invention proposes a multifunctional decorating light with an illuminating lamp and a CD case delicately assembled such that it can be used as a desk light, a CD box light, a photograph frame light, or a wall light through simple operation.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A multifunctional decorating light comprising:
   a CD case having an accommodating channel,
   a light stand pivotally installed in said accommodating channel of said CD case so as to be unfolded with respective to said CD case or folded in said accommodating channel, and
   an illuminating lamp installed at the outer end of said light stand.

2. The multifunctional decorating light of claim 1, wherein said CD case is formed with two case shells pivotally joined along one side thereof to be opened or closed.

3. The multifunctional decorating light of claim 1, wherein a sideward retractable frame is installed in said light stand, and said illuminating lamp is installed at the outer end of said retractable frame.

4. The multifunctional decorating light of claim 1, wherein a plurality of spaced positioning grooves are further disposed in said accommodating channel, and a supporting frame is pivotally installed on the bottom of said light stand such that said supporting frame can be fixedly embedded in a corresponding said positioning groove to achieve support when said light stand is unfolded.

5. The multifunctional decorating light of claim 4, wherein said supporting frame is U-shaped, and a locking plate is installed inward at one side of the opening of each said positioning groove such that said supporting frame can be fixedly locked and positioned in said positioning groove.

6. The multifunctional decorating light of claim 3, wherein said illuminating lamp is pivotally connected to said retractable frame.

7. The multifunctional decorating light of claim 3, wherein said retractable frame is a conductor providing low-voltage electricity for said illuminating lamp.

8. The multifunctional decorating light of claim 1, wherein a plurality of hanging holes can be disposed on the bottom surface of said CD case.

9. The multifunctional decorating light of claim 2, wherein a photograph can be placed in one of said two case shells of said CD case.

10. The multifunctional decorating light of claim 1, wherein the configuration and size of said CD case are the same as those of general CD cases, VCD cases, or DVD cases when said light stand is folded in said accommodating channels.

* * * * *